(No Model.)
J. S. DETWILER & M. G. STEVENS.
APPARATUS FOR AGING LIQUORS.
No. 531,718. Patented Jan. 1, 1895.
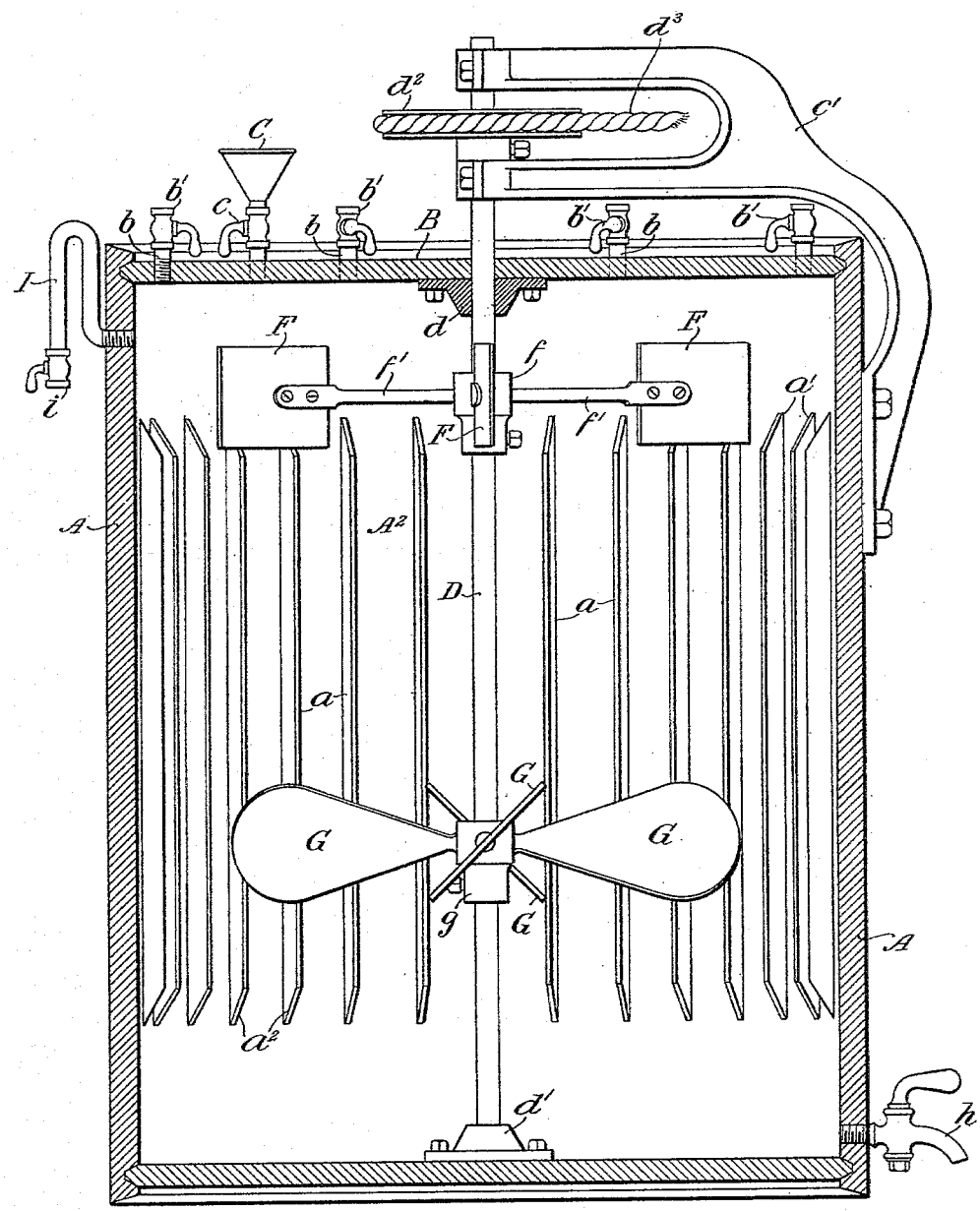
Witnesses:
Thomas M. Smith.
Richard C. Maxwell.
Inventors.
John S. Detwiler and Marshall G. Stevens,
By J. Walter Douglass.
Attorney.

UNITED STATES PATENT OFFICE.

JOHN S. DETWILER, OF PHILADELPHIA, PENNSYLVANIA, AND MARSHALL G. STEVENS, OF MERCHANTVILLE, NEW JERSEY.

APPARATUS FOR AGING LIQUORS.

SPECIFICATION forming part of Letters Patent No. 531,718, dated January 1, 1895.

Application filed February 6, 1893. Serial No. 461,206. (No model.)

*To all whom it may concern:*

Be it known that we, JOHN S. DETWILER, residing in the city of Philadelphia, in the county of Philadelphia and State of Pennsylvania, and MARSHALL G. STEVENS, residing at Merchantville, in the county of Camden and State of New Jersey, citizens of the United States, have invented certain new and useful Improvements in Apparatus for Aging and Purifying Liquors, of which the following is a specification.

Our invention has relation to the curing, aging and purifying of liquors; and in such connection it relates more particularly to the construction and arrangement of apparatus for such purposes.

The principal objects of our present invention are, first, to provide a simple, inexpensive and efficient apparatus for expeditiously curing and aging liquors to such extent as ordinarily has been only accomplished in the resort to natural methods by a lapse of years of standing with the attendant appreciable loss by evaporation and otherwise of the liquor; second, to provide an apparatus adapted for curing, aging and purifying liquors with means for effecting the subdivision or separation of the molecules of the liquors under the influence of air or other agent in order to improve the quality and taste of the same by the liberation of ether or noxious gases therefrom.

Our invention stated in general terms, comprises apparatus constructed and arranged substantially as hereinafter described and claimed.

The nature, features and scope of our invention will be more fully understood from the following description taken in connection with the accompanying drawing forming part hereof and illustrating partly in vertical central section and partly in elevation an apparatus embodying the general features of our invention.

Referring to the drawing, A is a tank of wood or other preferred material, having internal radial ribs $a$, concentrically disposed with respect to a median line of the tank A, and located some distance from the top and also from the bottom of the tank and with slanting ends $a'$ and $a^2$.

B, is the top of the tank provided with tubes $b$, extending through the same and having valves $b'$, connected therewith for controlling the quantity of air, gas or other agent introduced into the interior of the tank A.

C, is a feed hopper mounted in the top of the tank and having a valve $c$.

D, is a vertical shaft extending through the tank A, and held in required position therein in bearings $d$ and $d'$, suitably secured respectively to the top and bottom of the tank. The shaft D, extends beyond the top B, of the tank and is journaled to a U-shaped bracket $e'$, supported in position from the surface of the tank A. Mounted on the upper end of the shaft D, is a pulley $d^2$, adapted for the reception of a belt or chain $d^3$, for rotating the shaft D, and the devices connected therewith, to be presently fully explained.

To the shaft D, in the upper part of the tank is secured a detachable hub $f$, provided with curved arms $f'$, having vanes or fans F, secured thereto and adapted to create a circulation or agitation of the air, gas or other agent entering through the tubes $b$, when open.

$g$, is a detachable hub secured to the shaft D, in the lower part of the tank and provided with flaring blades G. These blades are adjusted to the shaft D, in such manner as to effect a thorough agitation of the liquor to undergo treatment in the tank and so that an intimate admixture of the air, gas or other agent with the liquor may be insured so as to break up the molecules thereof and to afford ethers or other gases to be liberated therefrom.

$h$, is a discharge cock or spigot connected with the tank or vat A, at or near the bottom thereof and adapted to permit of the removal of the contents of the tank A, when requirements demand.

I, represents a series of pipes or vents with stop-cocks $i$, in the periphery of the tank at the upper part thereof. When these pipes are open, they permit air being expelled therethrough from the interior of the tank by means of the said fans F.

The operation of the apparatus hereinbefore described, is as follows: It must be assumed that in the charging of the liquor into the tank A, to be treated, the stop-cock $h$, at or near the bottom of the tank is closed and the valves $b'$, of the tubes $b$ are opened. The liquor is introduced through the hopper C, by the opening of the valve $c$, into the tank and until the same is filled to the required height therein. Above the liquor is thus formed the superposed air and fluid mixing and purifying chamber $A^2$. The valve $c$, of the hopper C, may then be closed and the valves $b'$ of the tubes $b$, opened to their full extent in order to permit the incoming air, gas or other agent to enter the tank in a downward direction into the chamber $A^2$, when the stop-cocks $i$, in the pipes I, are turned so as to open the latter. Motion is then imparted to the pulley $d^2$, mounted on the main shaft D, by means of the belt or chain $d^3$, from a suitable source of power, not shown, to cause the rapid rotation of the shaft D, and therewith the respective vanes or fans F, in order to thoroughly agitate the same and also the flaring blades G, which in conjunction with the radial ribs $a$, of the tank A, thoroughly agitate the liquor therein and cause a sub-division or breaking up of the molecules thereof in the presence of the air or gas agitation in the chamber $A^2$, in order to effect the curing, aging and purifying of the liquor. These actions due to the intimate admixture and combination of the air, gas or other agent therewith, set free the impurities and non-condensed ether or other gases contained therein which may be permitted to escape from the tank through the tubes $b$, into the air.

Having thus described the nature and objects of our invention, what we claim as new, and desire to secure by Letters Patent, is—

An apparatus for aging liquors, comprising a tank having internal radial ribs located some distance from the top and bottom of the tank, tubes in the top of said tank provided with stop-cocks, a tube or vent in the side of said tank, a vertical shaft, a detachable hub with curved arms provided with vanes and located on the upper part of said shaft, a detachable hub with blades extending therefrom and located on the lower part of said shaft held in bearings in the bottom and top of said tank and projecting therefrom and said shaft supported to a divided bracket secured to said tank, a grooved pulley detachably secured to said shaft between said divided bracket, a cord or chain engaging said pulley and adapted to impart motion thereto, and a discharge cock connected with the lower part of said tank, substantially as and for the purposes described.

In witness whereof we have hereunto set our signatures in the presence of two subscribing witnesses.

JOHN S. DETWILER.
MARSHALL G. STEVENS.

Witnesses:
GEO. W. REED,
CHAS. C. COLLIER.